May 6, 1930.  F. H. ROYCE  1,757,337
RESILIENT DRIVING GEAR PARTICULARLY FOR HALF
SPEED SHAFTS OF INTERNAL COMBUSTION ENGINES
Filed May 3, 1929
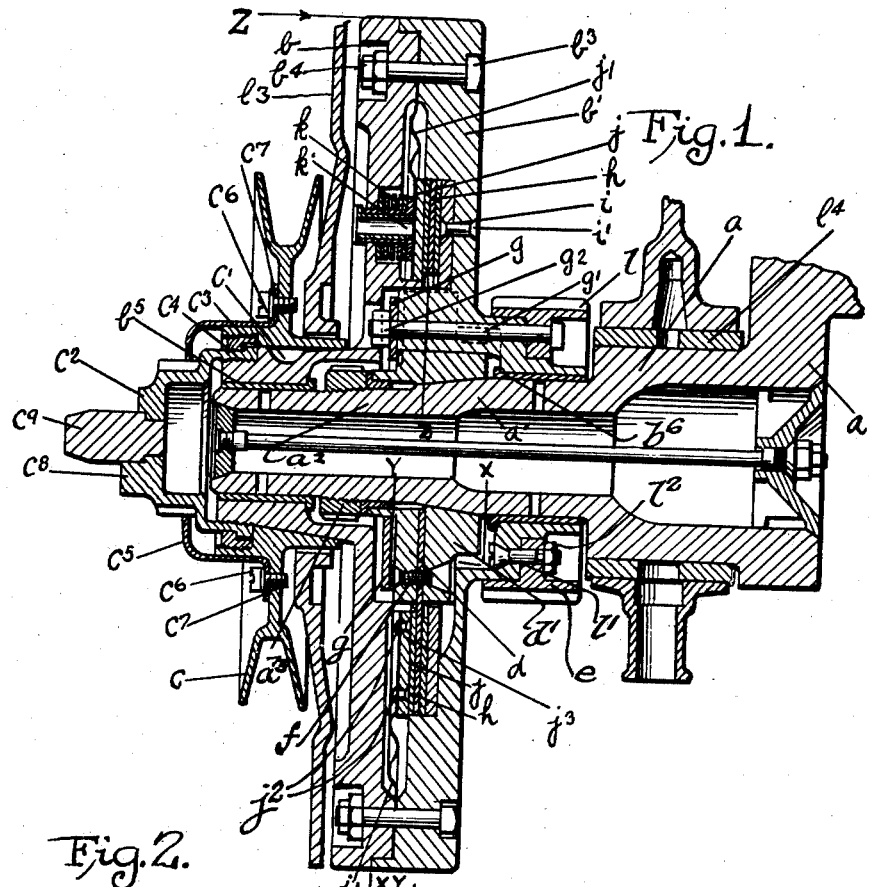
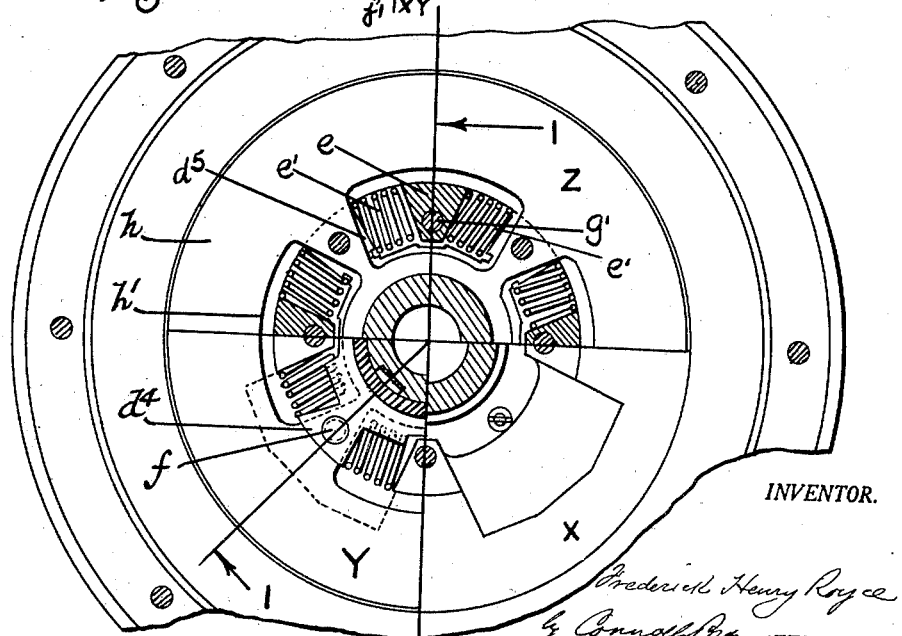
INVENTOR.
Frederick Henry Royce
G. Connolly
ATTORNEYS Patented May 6, 1930

1,757,337

UNITED STATES PATENT OFFICE

FREDERICK HENRY ROYCE, OF WEST WITTERING, CHICHESTER, ENGLAND, ASSIGNOR TO ROLLS ROYCE LIMITED, OF DERBY, ENGLAND

RESILIENT DRIVING GEAR, PARTICULARLY FOR HALF-SPEED SHAFTS OF INTERNAL-COMBUSTION ENGINES

Application filed May 3, 1929, Serial No. 360,047, and in Great Britain April 10, 1928.

This invention has reference to damped resilient drives of the type in which the damping is effected by a form of friction plate clutch.

In many such devices it is necessary or desirable to ensure that there shall be no rotational slack in the damping device, and hence the common form of clutch composed of two sets of annular friction plates formed with serrations on inner and outer circumferences respectively, engaging axial serrations respectively on a shaft and drum, respectively parts of the driving and driven members, is unsuitable.

It has been proposed heretofore by me to construct a damped resilient drive in which there shall be no rotational slack in the damping device, by arranging that a plate rigidly mounted on the driving member shall be frictionally engaged on each side by plates, one of which is rigidly mounted on the driven member, and the other of which is mounted, and axially movable on the driven member, and is rendered free from rotational slack by means of pins parallel to the axis of rotation of the members, rigidly supported on the driven member engaging and slidably fitting holes through such slidable plate.

This invention is an improved method of securing an axially movable plate in a friction plate clutch against rotation and all rotational slack, for which I have filed an application in England, April 10, 1928, Patent No. 320,066.

According to this invention the axially movable plate or plates of a friction clutch to be secured is or are provided with a radial extension which is axially flexible, and such extension is clamped around the periphery thereof to the member of the clutch to which it is rotably fixed, whereby the central or inner part of the plate is free to move axially while rigidly held rotationally.

The said extension can consist of a thin plate of springy steel attached to the side of the friction plate and formed with annular corrugations at suitable intervals from the centre beyond the periphery of the friction plate. The said extension can be clamped to the member by any known means such as for example by a flange secured at right angles to the member, carrying a drum made in two sections fastened together by screws, between which sections the extension is clamped.

This invention is particularly suitable for the half speed shafts of internal combustion engines, where it is desired to provide a damped resilient drive, and ensure that there shall be no rotational slack in the damping device.

An example of this invention applied to the drive of the half speed shaft of an internal combustion engine is illustrated in the accompanying drawings.

Figure 1 is a vertical section of the end of the crankshaft carrying the timing gear auxiliary damping fly wheel and fan belt pulley of an internal combustion engine on line 1—1 of Figure 2. Figure 2 is a section through the resilient drive device on the three section lines XX, YY and ZZ in Figure 1.

$a$ is an extension from the crank shaft having a tapered and longitudinally serrated part $a^1$ and a threaded part $a^2$. $b$ and $b^1$ are the two halves of the fly wheel bolted together by the bolts $b^3$ and the castellated nuts $b^4$ and mounted freely on the crankshaft extension $a$ on the bearing bushes $b^5$ and $b^6$. The part $b^1$ is formed with a recess at its centre to receive the members $d$ and $d^1$ and other members hereinafter described. $c$ is the fan belt pulley mounted on the portion of the fly wheel $b$ and keyed thereto so as to rotate therewith by means of the key $c^1$ and secured to such part of the fly wheel by the cap nut $c^2$. $c^3$ is an annular ring screwed inside the pulley $c$ having an internal projection overlapping an external projection $c^4$ on the cap nut $c^2$. When the cap nut $c^2$ is unscrewed the pulley $c$ can be withdrawn from its mounting on the fly wheel $b$. To prevent accidental unscrewing of the cap nut $c^2$ a locking plate $c^5$ is secured to the pulley $c$ by means of the screws $c^6$ and the washers $c^7$. To provide for hand starting, the cap nut $c^2$ has a jaw clutch $c^8$ and a locating member $c^9$.

$d$ and $d^1$ are two annular members internally axially serrated secured to the crankshaft extension $a$ by means of the taper and serrations thereon and the nut $d^3$ engaging the threaded part $a^2$ of the said extension. The members $d$ and $d^1$ are cut away in parts from their outer circumferences so as to leave projections or lugs $d^4$ (Figure 2), the faces of these lugs are formed with bosses $d^5$ to locate springs hereinafter described. From the base of the recess in the portion of the flywheel $b^1$, are formed radial projections or lugs $e$ projecting between the lugs $d^4$ on the members $d$ and $d^1$ and springs $e^1$ are inserted between the lugs $e$ and the lugs $d^4$ located on the locating bosses $d^5$ on the latter.

The springs are further kept in position by the annular ring $g$ secured by the bolts $g^1$ through the lugs $e$ and the nuts $g^2$ to the half of the fly wheel $b^1$. The members $d$ and $d^1$ are secured together by screws $f$ passing through the lugs $d^4$ and riveted over after being tightened. Sandwiched between the members $d$ and $d^1$ and clamped thereto by the action of the screws $f$ which pass through such members is an annular clutch plate $h$, being cut away as shown in Figure 2 at $h^1$ to allow the lugs $e$ and the springs $e^1$ to pass through it. The plate $h$ extends radially into the part of the recess in the part $b^1$ beyond the lugs $e$ and is in frictional engagement with the parts $b$ and $b^1$ by means now to be described. An annular friction plate $i$ is secured to the part $b^1$ by rivets $i^1$. Sandwiched between the two halves of the fly wheel $b$ and $b^1$ and rigidly secured thereto by means of the bolts $b^3$ is the plate or disc $j$ of springy metal having annular corrugations $j^1$. Secured to the plate $j$ by rivets $j^2$ is the presser plate $j^3$. Recesses are cut in the portion of the fly wheel $b$ and springs $k$ inserted operating the presser plate $j^3$ by means of plungers $k^1$. $l$ is the timing gear wheel secured to the portion of the fly wheel $b^1$ by means of the bolts $g^1$ and screws $l^1$ and nuts $l^2$. $l^3$ is a portion of the timing gear housing and $l^4$ is a crankshaft bearing supported therein.

With apparatus constructed as described owing to the springs $e^1$ between the lugs $e$ and the lugs $d^4$ the drive is resilient while relative oscillation of crankshaft and flywheel is damped out by means of the friction device and all rotational slack is eliminated by reason of the axially moving plate $j$ being rigid for rotation with the fly wheel while end slack is taken up by the springs $k$.

It will be understood that the principle of this invention applies equally to a circular plate or disc with an inwardly projecting portion suitably clamped or otherwise fixed.

What I claim is:—

A friction clutch of the character described, comprising driving and driven axially movable plates, a disc of resilient metal to which one set of plates is secured, and which is provided with corrugated outwardly extending, radial, axially flexible, extensions, secured to the periphery of one of the supporting members with which said plates are associated, and elastic means for pressing said plates together.

In testimony whereof I have hereunto affixed my signature.

FREDERICK HENRY ROYCE.